US005188492A

United States Patent [19]

McCracken

[11] Patent Number: 5,188,492

[45] Date of Patent: Feb. 23, 1993

[54] SPLIT RING CLAMPING ARRANGEMENT

[75] Inventor: Robert E. McCracken, Easley, S.C.

[73] Assignee: Ryobi Motor Products Corporation, Easley, S.C.

[21] Appl. No.: 788,189

[22] Filed: Nov. 5, 1991

Related U.S. Application Data

[63] Continuation-in-part of Ser. No. 661,619, Feb. 28, 1991, Pat. No. 5,074,724.

[51] Int. Cl.[5] .......................... B27C 5/10; F16B 37/00

[52] U.S. Cl. ................................ 409/182; 144/134 D; 411/7; 411/911; 411/435

[58] Field of Search .......................... 24/278, 279, 285; 144/134 D, 136 C, 136 R; 409/175, 181, 182, 204, 209; 411/6, 7, 409, 435, 911

[56] References Cited

U.S. PATENT DOCUMENTS 131,843 10/1872 Brooks .
1,899,883 2/1933 Sacrey .
1,929,116 10/1933 Kirton .
2,164,485 7/1939 Yantis ...................................... 411/7
2,613,704 10/1952 Sacrey .
2,842,173 7/1958 Turner et al. .
2,867,251 1/1959 Moretti et al. .
2,988,119 6/1961 Godfrey et al. .
3,273,443 9/1966 Rubin ...................................... 411/7
3,313,198 4/1967 Walton .
3,363,510 1/1968 Burrows et al. .
3,443,479 5/1969 Hawley et al. .
3,466,973 9/1969 Rees .
3,489,191 1/1970 Blevins .
3,935,788 2/1976 Gilmore .
4,051,880 10/1977 Hestily .
4,108,225 8/1978 Hestily .
4,239,428 12/1980 Berzina .
4,316,685 2/1982 George .
4,319,860 3/1982 Beares .
4,469,235 9/1984 Parker .
4,566,830 1/1986 Maier et al. .
4,647,260 3/1987 O'Hara et al. .
4,679,606 7/1987 Bassett .
4,731,512 3/1988 Barriac .
5,074,724 12/1991 McCracken .
5,078,557 1/1992 McCracken .................... 144/134 D
5,088,865 2/1992 Beth et al. ...................... 144/134 D

FOREIGN PATENT DOCUMENTS 2810061 9/1979 Fed. Rep. of Germany ...... 411/911

*Primary Examiner*—Daniel W. Howell
*Attorney, Agent, or Firm*—Brooks & Kushman

[57] ABSTRACT

A router having a depth of cut adjustment mechanism including an adjustment ring which engages a screw thread on the motor housing and rotationally engages the router base. There is further provided an arrangement for preventing relative rotation between the motor housing and the base. The adjustment ring is formed as a split ring with projections adjacent opposite sides of the split, each with a frusto-conical camming surface. A circular clamp knob having a plurality of tabs extending axially outward from a top surface and radially outward from a central axis is mounted for threaded rotation on a bolt passing through the projections radially with respect to the router motor housing which bears against the camming surfaces so as to squeeze the ring in order to effect a clamping action as the knob is moved inwardly.

12 Claims, 9 Drawing Sheets

SPLIT RING CLAMPING ARRANGEMENT

CROSS-REFERENCE TO RELATED APPLICATIONS

This invention is a continuation-in-part of pending prior application Ser. No. 661,619, which was filed on Feb. 28, 1991, now U.S. Pat. No. 5,074,724, the prior application being in the name of Robert E. McCraken, assigned to Ryobi Motor Products Corporation and entitled "Split Ring Clamping Arrangement."

TECHNICAL FIELD

This invention relates to a depth of cut adjustment mechanism for a portable electric routing tool and, more particularly, to an arrangement for clamping a depth of cut adjustment split ring to such tool.

BACKGROUND ART

The particular router with which the present invention finds utility includes a motor housing having an external cylindrical portion, with a cutting tool mounted at one end of the motor housing to the shaft of the motor supported within the motor housing. The cylindrical portion has a first longitudinal region with a substantially smooth surface and a second longitudinal region with an external screw thread. The router also includes a base having a cylindrical bore for slidably receiving therein the first longitudinal region of the motor housing cylindrical portion. The depth of cut adjustment mechanism includes an adjustment ring which is split with an opening between two opposed ends The adjustment ring engages the screw thread on the motor housing and rotationally engages the base, whereby rotation of the adjustment ring effects relative longitudinal motion between the motor housing and the base so that the distance which the cutting tool projects beyond the base may be varied It is an object of this invention to provide an arrangement for releasably securing the adjustment ring to the motor housing and the base so as to maintain the position of the base relative the motor housing.

Prior router depth of cut adjustment mechanisms utilizing a split adjustment ring have included projections on opposite sides of the split which are squeezed together to effect a clamping action by means of a threaded member arranged generally tangential to the ring. These arrangements are not entirely satisfactory because, for example, there is insufficient room for manipulating the threaded member. Such arrangements are usually of two general configurations. First is an arresting screw having a knob as shown in U.S. Pat. Nos. 4,566,830 and 3,443,479. Such a configuration enables equal amounts of force being applied to the knob for purposes of tightening and loosening of the arresting screw in order to select a predetermined depth of the cutting tool.

An alternative form of threaded members is in the shape of a wing-nut as disclosed in U.S. Pat. Nos. 4,319,860; 4,316,685; 4,239,428; and 2,613,704. The wing-nut configuration enables an equal amount of force to be applied in both the fastening direction and the loosening direction for purposes of moving the adjustment ring relative to the motor housing to select a predetermined depth of cut.

Vibration of the drive unit in the router results in further tightening of the threaded member. The combination of large amounts of force being applied to the threaded member by hand tightening in conjunction with the vibration of the motor results in the necessity of excess torque being required to loosen the threaded member.

U.S. Pat. Nos. 131,843; 3,313,198; and 1,929,116 disclose one-way screws capable of being securely fastened but which results in slippage of a screw driver or the like when the screws are attempted to be removed because of a helical ramp surface in a direction opposite that of the fastening direction. Such configurations, however, do not provide finger grips for hand-tightening nor do they provide a means for exerting additional force upon the screw for loosening same.

A threaded member for use with a router capable of limiting the amount of hand-tightening in one direction while providing a means for exerting a greater force in an opposite direction for loosening of the threaded member has not been taught or suggested in existing patents. It is therefore another object of this invention to provide a more effective split ring clamping arrangement.

SUMMARY OF THE INVENTION

The foregoing, and additional, objects are attained in accordance with the principles of this invention by providing a clamping arrangement for use in the environment described above which includes first and second projections formed on the split ring adjacent opposite sides of the split. Each of the projections has a frusto-conical camming surface. A circular knob mounted for threaded rotation on a bolt passing through the projections radially with respect to the router motor housing bears against the camming surface so as to squeeze the ring to effect a clamping action as the knob is moved inwardly.

In accordance with an aspect of this invention, the surfaces of the first and second portions are shaped such that at a section taken along a plane orthogonal to the bolt each of the surfaces describes an arc of a circle having a predetermined diameter irrespective of the position of the plane along the surfaces, the center of the circle varying linearly as the plane moves along the bolt.

In accordance with another aspect of this invention, the clamp knob inner surface is frusto-conical to provide substantial surface engagement with the first and second projection surfaces.

In accordance with a further aspect of this invention, a clamp knob has a body including a central axis and a peripheral surface extending about the central axis between spaced body surfaces. A tab is provided extending axially outward from one of the body surfaces and radially outward from the central axis The tab has a first side in perpendicular relation to one of the body surfaces for receiving a finger grip to positively rotate the knob in a first direction. The tab is provided with a second side opposite the first side in a helically ramped relation to the first side for limiting the amount of force capable of being applied when rotating the knob in a second direction opposite the first direction. A supporting means is provided for supporting the knob on the router.

In accordance with an additional aspect of this invention, a router is provided having a base which includes an annular groove circumferentially located about the base. The base also has a cylindrical bore therein and a lower support surface attached thereto. A pair of handles are provided for manipulating the router along a work surface. A motor housing having a motor, a cutter shaft connected to and rotatably driven by the motor is provided such that the cutter shaft includes a collet for receiving a cutting tool. The motor housing includes an external screw thread circumferentially located about the motor housing. The motor housing is axially movable relative the base through the cylindrical bore allowing movement of the cutting tool to a selected depth relative the base. An adjustment ring cooperates with the motor housing and the base. The adjustment ring has an internal screw thread which cooperates with the external screw thread allowing movement of the motor housing relative to the base in response to rotational movement of the adjustment ring along the external screw thread. The adjustment ring also has an inwardly directed projection which cooperates with the annular groove allowing rotatable movement of the adjustment ring about the base while preventing longitudinal movement of the adjustment ring relative to the base. A clamp knob is provided which extends radially from the adjustment ring and cooperates therewith for clamping and unclamping of the adjustment ring. The adjustment ring rotatably cooperates with the external screw thread and the annular groove for allowing movement of the motor housing relative the base to set the cutting tool at a predetermined depth relative the base. The clamp knob has a body which includes a peripheral surface extending circumferentially about a central axis between spaced apart body surfaces A plurality of tabs have a first surface for positively rotating the clamp knob away from the adjustment ring allowing a first projection and a second projection to separate enabling movement of the adjustment ring. The tabs also have a second surface opposite the first surface for limiting force applied to the clamp knob when rotating the clamp knob toward the adjustment ring thereby drawing the first and second projections together preventing movement of the adjustment ring once the predetermined depth of the cutting tool has been set.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

The foregoing will be more readily apparent upon reading the following description in conjunction with the drawings in which like elements in different figures thereof have the same reference numeral applied thereto and wherein.

BEST MODE FOR CARRYING OUT THE INVENTION

Figure 1:
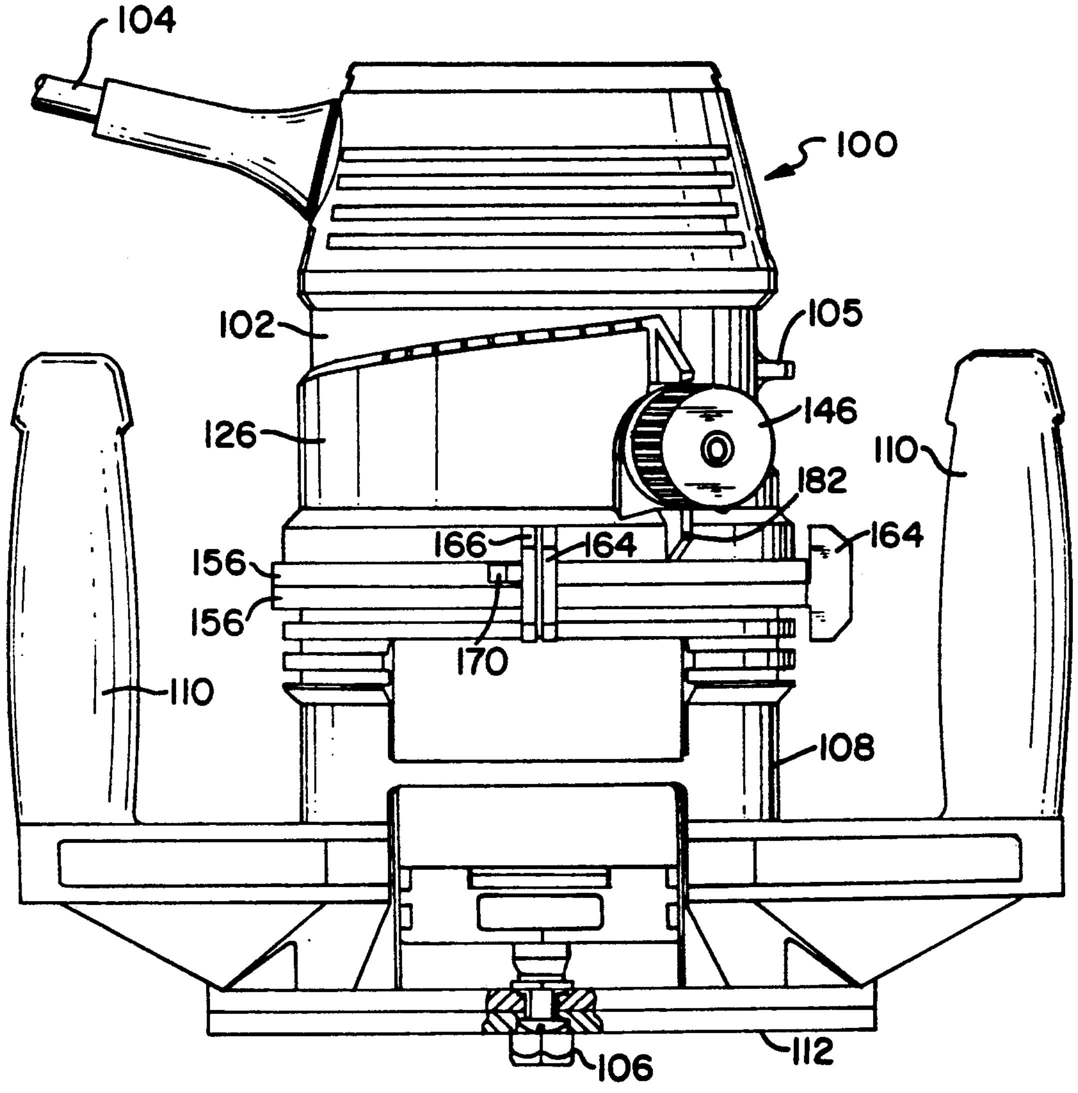
FIG. 1 is an elevational view, partially cut away, showing a router constructed in accordance with this invention.

Referring now to the drawings, FIG. 1 illustrates a router, designated generally by the reference numeral 100, which is constructed in accordance with the principles of this invention. The router includes a motor housing 102 which contains a motor (not shown) powered through a switch 105 and a line cord 104 and having a rotating output shaft on which is mounted a collet 106 for holding a cutting tool (not shown). The motor, its mounting within the motor housing 102, and the cutting tool collet form no part of the present invention and will not be described in any further detail.

The motor housing 102 is supported in a base 108, in a manner to be described in full detail hereinafter, which includes a pair of handles 110 by means of which an operator can manipulate the router 100 along a work surface. The motor housing 102 is supported in the base 108 so that the cutting tool can extend outwardly beyond the lower support surface 112 of the base 108. In operation of the router 100, the lower support surface 112 rests on the upper surface of the work and the distance that the cutting tool extends beyond the lower support surface 112 determines the depth of cut of the router 100. This depth of cut may be adjusted by varying the relative longitudinal position of the motor housing 102 relative the base 108.

Figure 2:
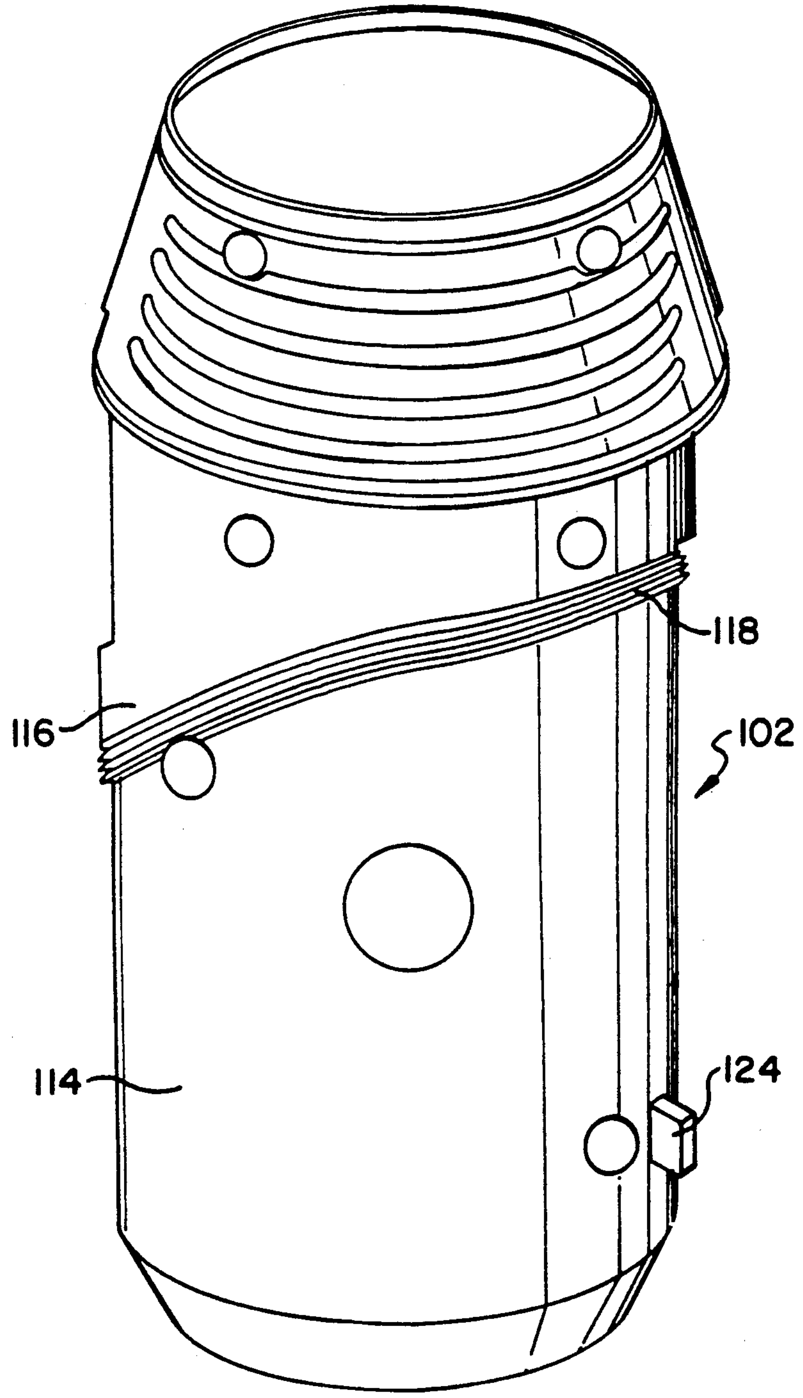
FIG. 2 is a perspective view of the motor housing of the router shown in FIG. 1.

As is best shown in FIG. 2, the motor housing 102 is generally cylindrical in external configuration. A first longitudinal region 114 of the motor housing 102 has a generally smooth surface, while a second longitudinal region 116 is formed with an external screw thread 118.

Figure 3:
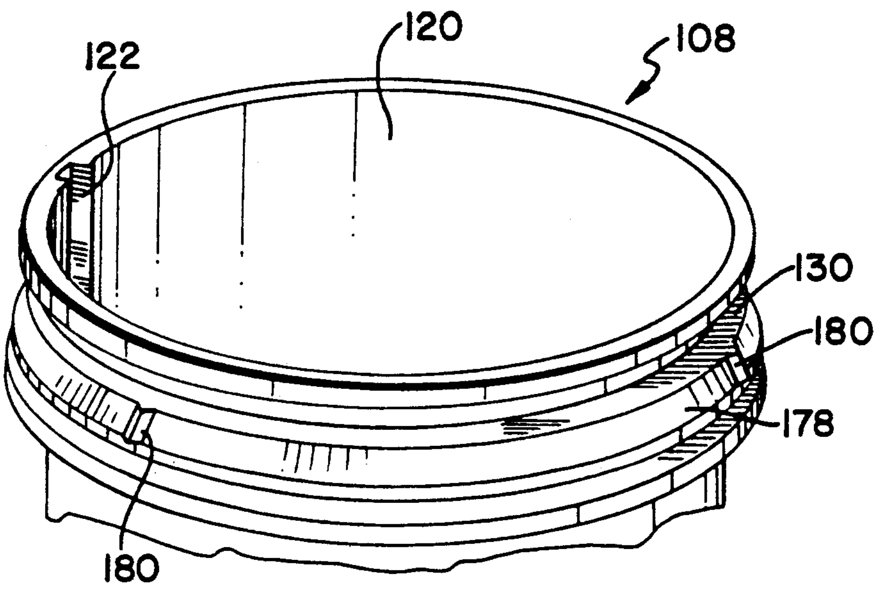
FIG. 3 is a perspective view of the top central portion of the base of the router shown in FIG. 1.

As shown in FIG. 3, the base 108 has a cylindrical bore 120 which is sized to slidably receive therein the smooth longitudinal region 114 of the motor housing 102. In order to prevent relative rotation between the motor housing 102 and the base 108, the cylindrical bore 120 of the base 108 is formed with a longitudinal groove 122 and the motor housing 102 is formed with a longitudinal groove 122 and the motor housing 102 is formed with a projection 124 complemental thereto.

The present invention is concerned with the arrangement for adjusting the depth of cut of the router 100. Accordingly, there is provided an adjustment ring 126 which engages both the screw thread 118 on the motor housing 102 and also rotationally engages the base 108.

Since the motor housing 102 cannot partake of rotational motion relative the base 108 because of the groove 122 and the projection 124, rotation of the adjustment ring 126 effects longitudinal displacement of the motor housing 102 relative the base 108, which varies the distance that the cutting tool projects beyond the lower support surface 112. Subsequent clamping of the adjustment ring 126 to the motor housing 102 and the base 108 maintains the desired depth of cut adjustment.

Thus, the adjustment ring 126 is formed with an internal screw thread 128 (FIG. 5) which is complemental to the external screw thread 118 of the motor housing 102. The base 108 is formed with an annular groove 130 at its upper end and the adjustment ring 126 is formed with an inwardly directed projection, or flange, 132 which engages the annular groove 130. Accordingly, rotation of the adjustment ring 126 does not affect its longitudinal position with respect to the base 108 but due to the pitch of the screw threads 118,128, the motor housing 102 is longitudinally displaced.

Figure 4:
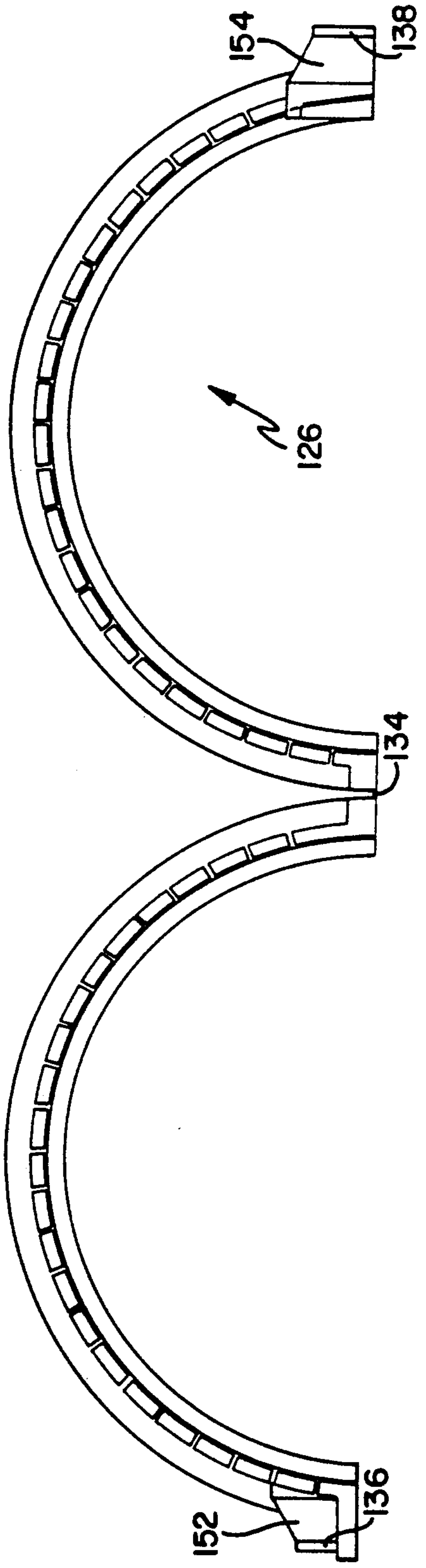
FIG. 4 is a top plan view of the adjustment ring of the router shown in FIG. 1, shown in its fully open state.
Figure 5:
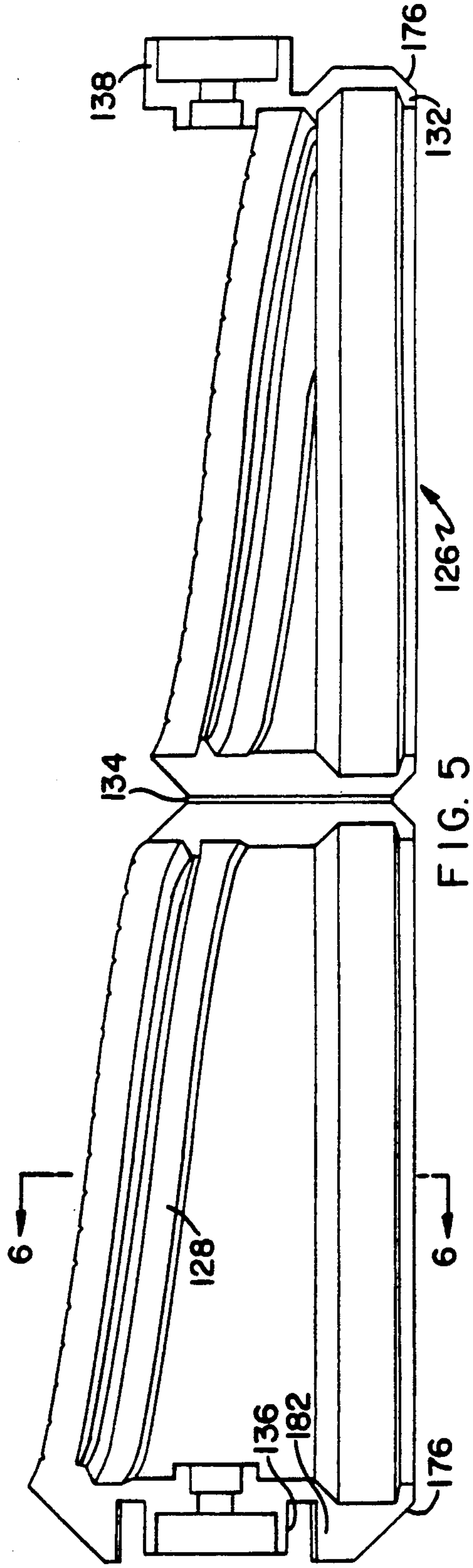
FIG. 5 is an elevational view of the opened adjustment ring shown in FIG. 4.
Figure 6:
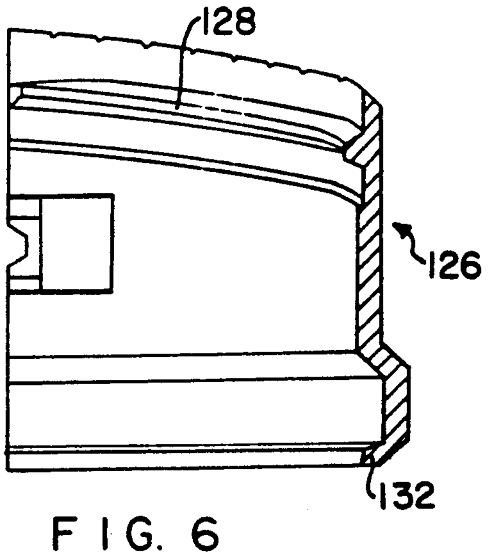
FIG. 6 is a cross-section of the adjustment ring taken along the line 6—6 in FIG. 5.

Preferably, the adjustment ring 126 is a split ring hinged at 134, as best shown in FIGS. 4 and 5. Each half of the adjustment ring 126 is generally semi-circular in plan. This allows for economical molding of the adjustment ring 126 and easy assembly onto the router 100. The adjustment ring 126 is preferably molded of a plastic material so that it is inherently resilient.

Figure 7:
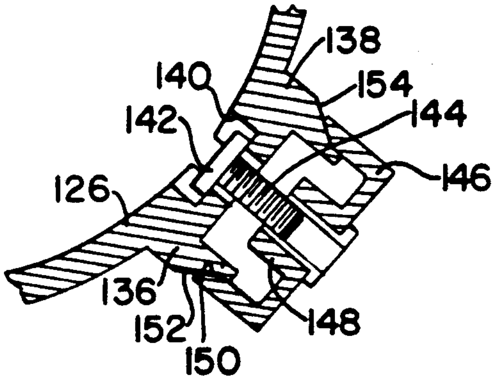
FIG. 7 is a cross-sectional view showing details of the clamp knob on the adjustment ring.
Figure 7A:
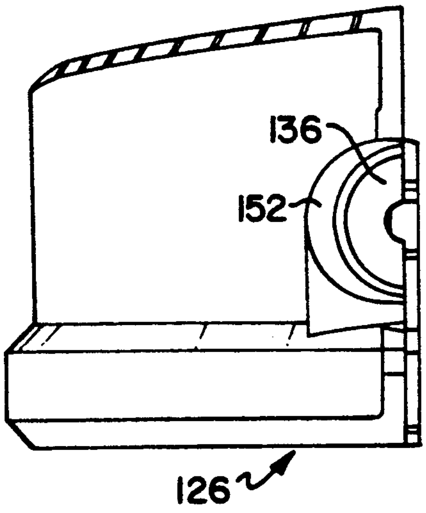
FIG. 7A is a front view of one end of the adjusting ring.

After the adjustment ring 126 is rotated to achieve a desired depth of cut, the ring 126 must be clamped to the motor housing 102 and the base 108 to maintain that depth of cut setting. Toward that end, the adjustment ring 126 is formed with a first projection 136 adjacent a first of the opposed ends flanking the split of the ring 126 and a second projection 138 adjacent the other opposed end flanking the split of the ring 126. Preferably, the projections 136,138 are mirror image halves of a frusto-conical structure When pressed together, the projections 136,138 provide a recess 140 which holds the head 142 of a threaded member 144 against rotation. A circular clamp knob 146 is provided. The knob 146 has an internally threaded boss 148 which is threadedly engaged with the threaded member 144, as is best shown in FIG. 7. The clamp knob 146 has an inner camming surface 150 which bears against the frusto-conical surfaces 152,154 of the projections 136,138, respectively Thus, clockwise rotation of the clamp knob 146 moves the clamp knob 146 closer to the motor housing 102 to draw the projections 136,138 toward each other, thereby closing the gap between the opposed ends of the adjustment ring 126. Movement of the clamping knob 146 toward the motor housing 102, also results in clamping the adjustment ring 126 to the motor housing 102 and the base 108. Conversely, counterclockwise rotation of the clamp knob 146 loosens the adjustment ring 126. Since the clamp knob 146 extends away from the router 100 to a region which is free of all obstructions, it is very easily manipulated by the operator.

The clamp knob 146 is circular, with the inner camming surface 150 being beveled so that it is frusto-conical. To provide substantial engagement of the inner camming surface 150 with the surfaces 152,154 of the projections 136,138 of the adjustment ring 126, the surfaces 152,154 are shaped such that at a section taken along a plane orthogonal to the threaded member 144, each of the surfaces 152,154 describes an arc of a circle having a predetermined fixed diameter irrespective of the position of the plane along the surfaces 152,154. The center of that circle varies linearly as the plane moves along the threaded member 144. Thus, as the clamp knob 146 is tightened on the threaded member 144 and the projections 136,138 are moved closed together, the inner camming surface 150 always engages the same size frusto-conical surface.

Advantageously, the router 100 is arranged with adjustable limit stops for the depth of cut adjustment mechanism so that the operator can quickly change the depth of cut setting between first and second preset depths of cut. These limit stops are provided on stop rings which encircle the base 108 and which may be fixed to the base 108 in preset angular orientations. The limit stops cooperate with structure on the adjustment ring 126 to provide limits to the range of angular rotation of the adjustment ring 126.

Figure 8:
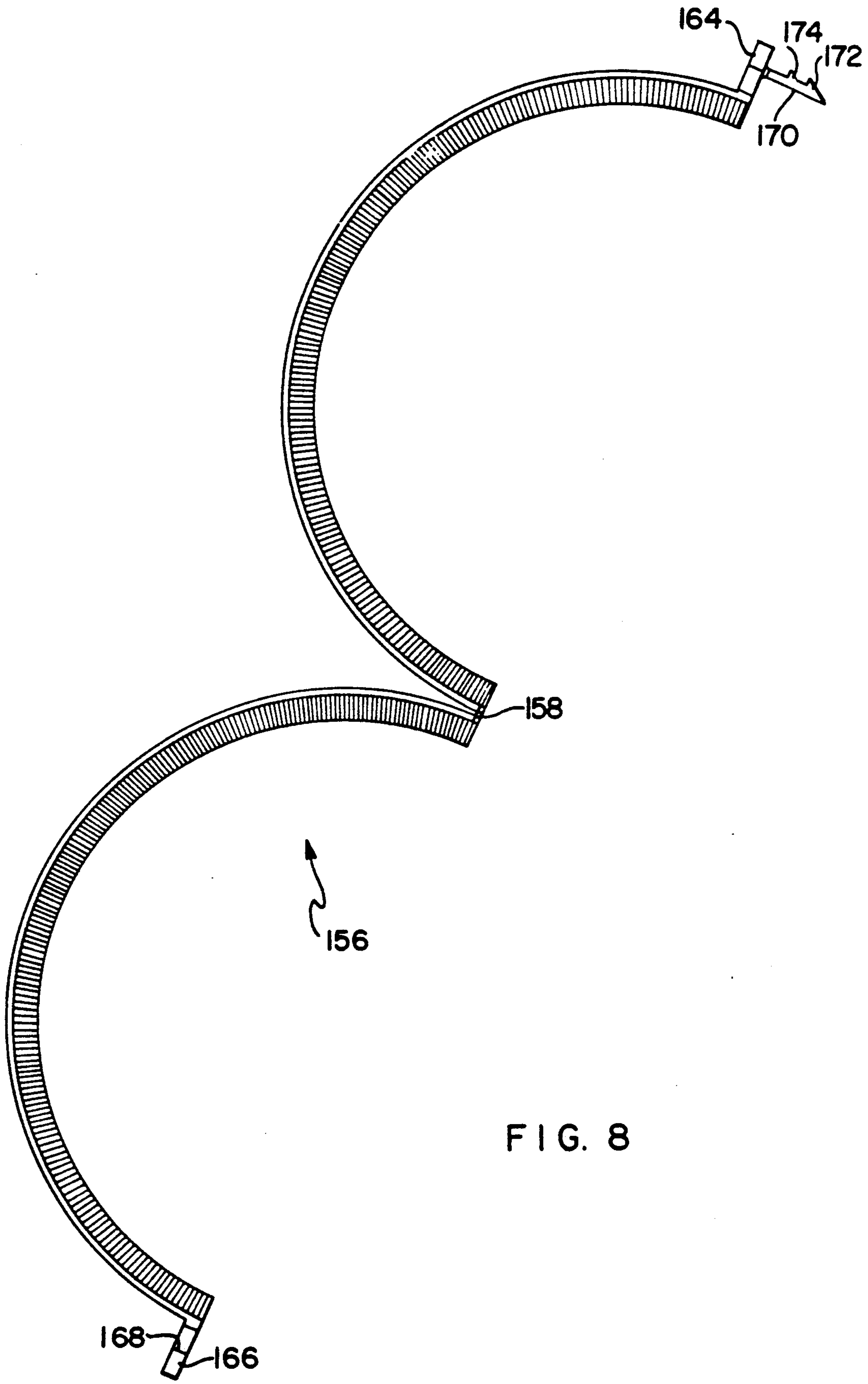
FIG. 8 is a top plan view of a stop ring of the router shown in FIG. 1, shown in its fully open state.
Figure 9:
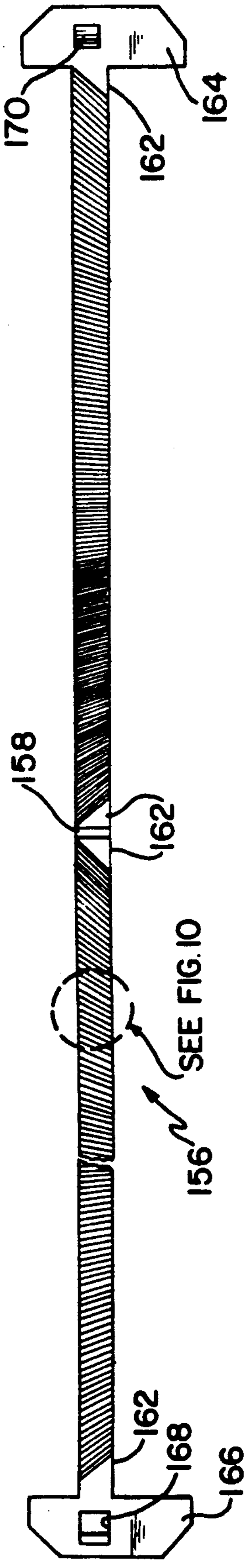
FIG. 9 is an elevational view of the opened stop ring shown in FIG. 8.
Figure 10:
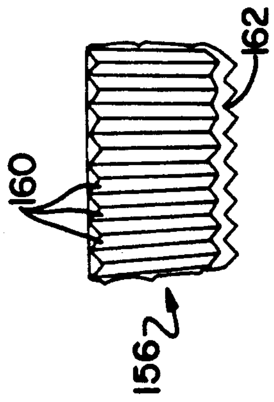
FIG. 10 is an enlarged detail of the stop ring shown in FIG. 9.

FIGS. 8-10 illustrate a stop ring 156 which may be utilized for the above-described function. A pair of such stop rings 156 are utilized, the stop rings being rotated 180° from each other when in use, as will be described in full detail hereinafter. Like the adjustment ring 126, the stop ring 156 is a split ring hinged at 158. Each half of the stop ring 156 is generally semi-circular in plan (FIG. 8) while being generally triangular in cross-section as can best be seen in FIG. 11. Thus, the inner surface of the stop ring 156 is at an angle of approximately 45°. This inner surface is serrated to form a plurality of grooves 160. The wider end surface 162 of the stop ring 156 is also serrated.

The stop ring 156 is preferably molded of a plastic material so that it is inherently resilient. The stop ring 156 is formed with an interfering projection 164 at one end and an adjustment projection 166 at its other end. The projections 164,166 are thus opposed across the opening of the split stop ring 156, and the spacing therebetween determines the overall circumference of the stop ring 156. To adjust that circumference, the adjustment projection 166 is formed with an opening 168 which is directed circumferentially of the stop ring 156. On the interfering projection 164, there is formed a tab 170 circumferentially directed toward the adjustment projection 166. The tab 170 includes a first barb 172 and a second barb 174 and is adapted for insertion through the opening 168. When the first barb 172 engages the projection 166, the circumference of the stop ring 156 is relatively large and when the second barb 174 engages the projection 166, the circumference of the stop ring 156 is smaller.

Figure 11:
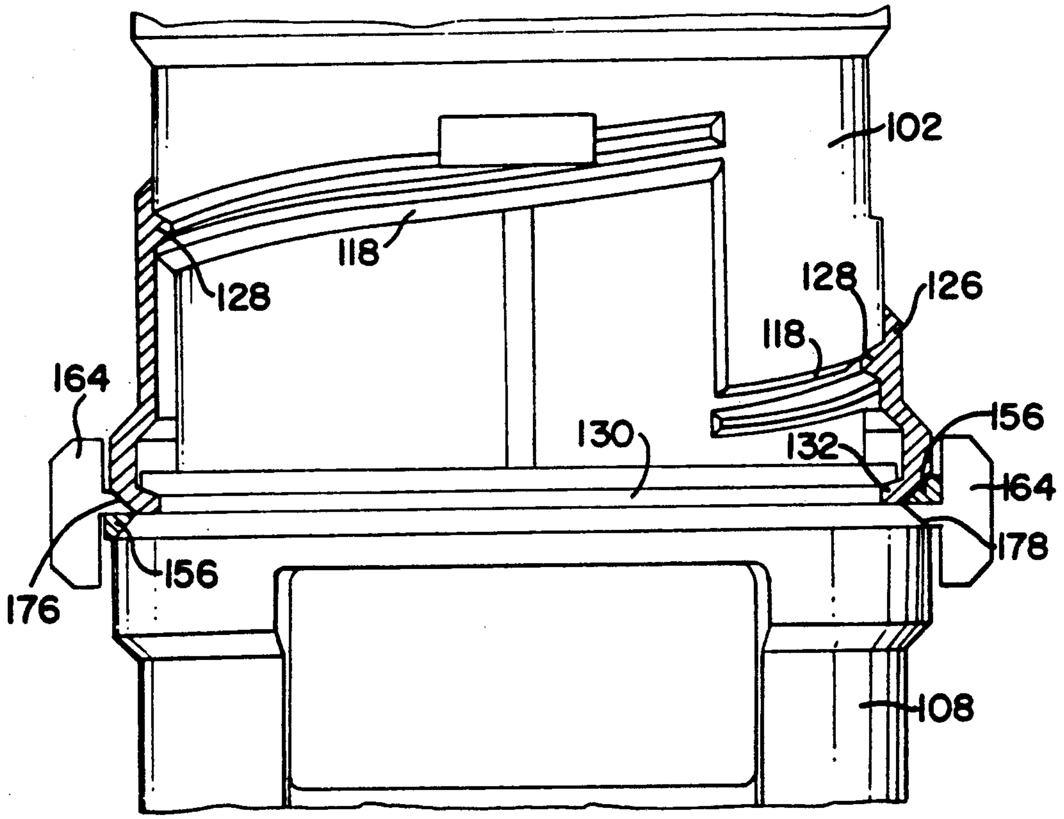
FIG. 11 is an elevational view, partly in cross-section, showing how the motor housing, the base, the adjustment ring and the stop rings of the router shown in FIG. 1 fit together.
Figure 12:
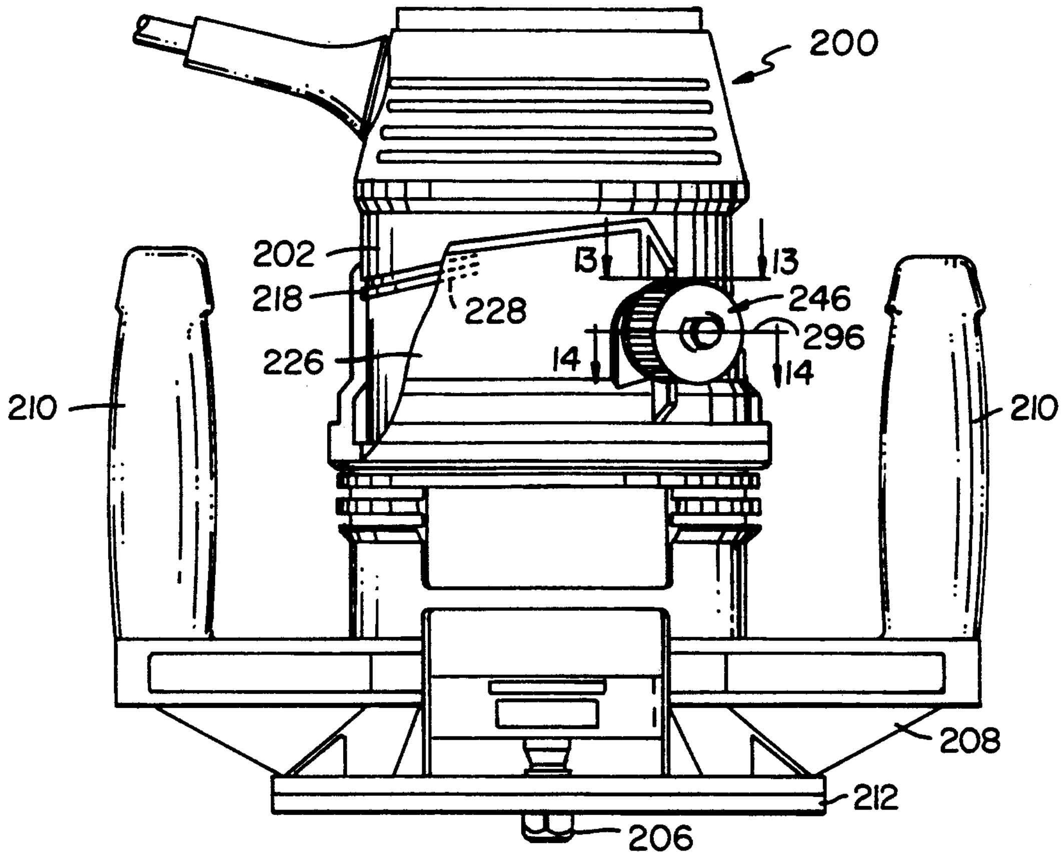
FIG. 12 is a perspective view of an alternative embodiment of the present invention having a novel clamp knob construction.

To accommodate the stop rings 156, the lower end of the adjustment ring 126 is formed with a beveled annular surface 176, as best shown in FIG. 11. The base 108 is formed with a beveled annular surface 178 adjacent the annular groove 130, so that when the adjustment ring 126 is installed on the base 108 the surfaces 176 and 178 together form a V-shaped annular groove. The pair of stop rings 156 fit within this groove, with one of the stop rings oriented 180° with respect to the other stop ring, as is best shown in FIG. 11.

To effectively fix the position of the stop rings 156 in the V-shaped annular groove, the beveled annular surface 178 is formed with a number of ribs 180 which are directed transversely to the direction of rotation of the stop rings 156 in the V-shaped annular groove. The ribs 180 cooperate with the serration grooves 160 of the lower one of the stop rings 156 when the second barb 174 engages the adjustment projection 166 so that the stop ring 156 is at its smaller circumference. In this state, the lower stop ring 156 is effectively clamped and prevented from rotating. The cooperation of the serrations on the end surfaces 162 of the stop rings 156 prevents the upper one of the stop rings 156 from rotating with respect to the lower one of the stop rings 156 when the second barb 174 of the upper stop ring 156 engages the adjustment projection 166 of the upper stop ring 156.

For cooperation with the interfering projections 164 of the stop rings 156 so as to limit the extent of angular rotation of the adjustment ring 126, the adjustment ring 126 is formed with a tab 182 which extends toward, but terminates before, the beveled annular surface 176, as is best shown in FIG. 1. The projections 164,166 of the stop rings 156 extend beyond the V-shaped annular groove and therefore extend into the path of travel of the tab 182. Thus, the range of angular rotation of the adjustment ring 126 is limited by the angular positions of the stop rings 156.

In operation of the limit stop arrangement just described, the stop rings 156 are set with their first barbs 172 engaging the adjustment projections 166 so that the circumferences of the stop rings 156 are relatively large and the stop rings 156 are free to rotate independently in the V-shaped annular groove. The operator then sets the greater of the two preset depths of cut. The lower stop ring 156 is then moved so that its interfering projection 164 abuts the tab 182. The adjustment tab 170 is then manipulated so that the second barb 174 engages the adjustment projection 166 of the lower stop ring 156. This causes the lower stop ring 156 to be clamped to the base 108 be means of the ribs 180 and the serration grooves 160. Next, the adjustment ring 126 is moved to set the shallower depth of cut. The upper stop ring 156 is then moved so that its interfering projection 164 abuts the tab 182. Its adjustment tab 170 is then manipulated so that the second barb 174 engages the adjustment projection 166. This clamps the upper stop ring 156 to the lower stop ring 156 by means of the serrations on the end surfaces 162. Thereafter, the operator can quickly change the depth of cut between the preset deeper and shallower depths of cut, as defined by the positions of the two stop rings 156, by rotating the adjustment ring 126 until the tab 182 abuts against the respective interfering projection 164.

An alternative router embodiment 200 is depicted in FIG. 12–15. Router 200 is further similar to router 100 previously described, the difference being in the structure of clamp knob 246. A 200 series numeral designation rather than a 100 series numeral designation precedes the same or similar components common to both embodiments so that their function can be understood with reference to the description of router 100.

Figure 14:
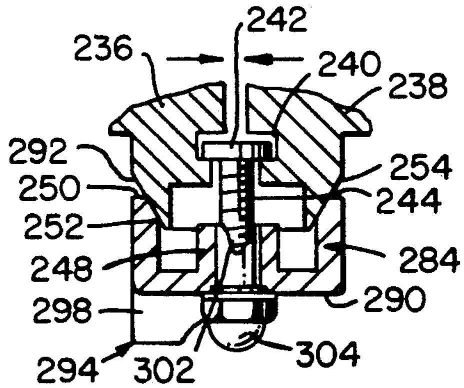
FIG. 14 is an enlarged cross-sectional view taken along line 14—14 of FIG. 12.
Figure 13:
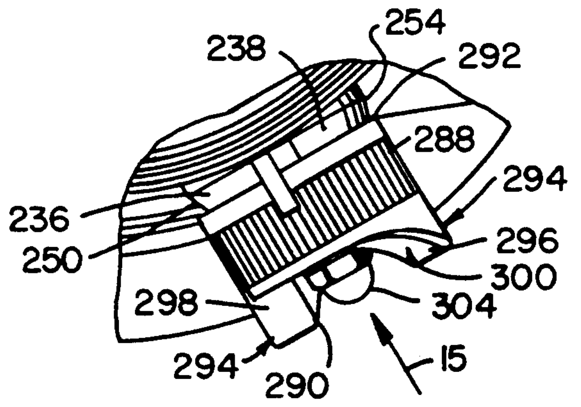
FIG. 13 is an enlarged partial plan view taken along line 13—13 of FIG. 12.

The clamp knob 246 is radially affixed to the adjustment ring 226. As shown in FIGS. 12 through 15, the threaded member 244 is located in a recess 240 which is formed by cooperation of the first projection 236 and the second projection 238 of the adjustment ring 226. The clamp knob 246 has a body 284 which has a central axis 286 which runs radially to the adjustment ring 226. The clamp knob 246 has a serrated peripheral surface 288 which extends circumferentially from the central axis. As shown in FIGS. 13 and 14, the peripheral surface 288 is located between a top surface 290 and a bottom surface 292 and provides a finger grip for rotation in either the clockwise direction for movement of the clamp knob 246 toward the adjustment ring 226 to draw the first and second projection 236 and 238 toward each other or the counter-clockwise direction for movement of the clamp knob 246 away from the adjustment ring 226 allowing the first and second projections 236 and 238 to separate.

Figure 15:
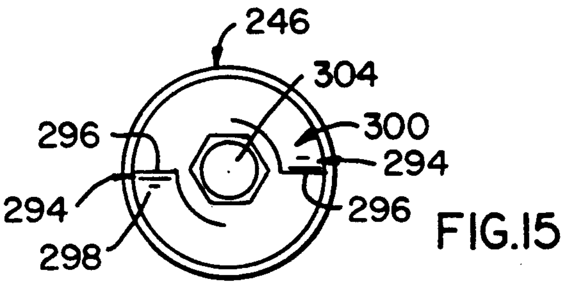
FIG. 15 is an axial end view of the clamp knob taken along line 15 of FIG. 3.

As shown in FIGS. 13–15, knob 246 is provided with a pair of tabs 294 extending axially outward from the top surface 290 and radially outward from the central axis. The tabs 294 are diametrically opposed to one another. Each tab 294 has a first side 296 and a second side 298. The first side 296 is in perpendicular relation to the top surface 290 so as to present a finger grip with a flat surface against which a large amount of force can be applied in the clockwise direction to move the clamp knob 246 away from the adjustment ring 226. The second side 298 has a helical ramp 300 which begins at the top surface 290 and ends where the first side 296 and the second side 298 meet. The helical ramp 300 limits the amount of force which may be applied in a counter-clockwise direction to move the clamp knob 246 toward the adjustment ring 226.

The central internally threaded boss 248 is molded or press-fitted into the body 284 of the clamp knob 246 which is supported onto the router 200 by a threaded member 244 as shown in FIG. 14. FIGS. 13 and 14 show a head 242 of the threaded member 244 which is fixed against rotation when seated within the recess 240. The threaded member 244 is positioned such that a threaded free end 302 of the thread member 244 is threaded through the central internally threaded boss 248 in the body 284 and covered by an acorn nut 304 to rotatably secure the clamp knob 246 to the router 200.

The clamp knob 246 shown in FIG. 14 is circular, with the inner camming surface 250 being beveled so that it is frusto-conical. To provide substantial engagement of the inner camming surface 250 with the surfaces 252,254 of the projections 236,238 of the adjustment ring 226, the surfaces 252,254 are shaped such that at a section taken along a plane orthogonal to the threaded member 244, each of the surfaces 252,254 describes an arc of a circle having a predetermined fixed diameter irrespective of the position of the plane along the surfaces 252,254. The center of that circle varies linearly as the plane moves along the threaded member 244. Thus, as the clamp knob 246 is tightened on the threaded member 244 and the projections 236,238 are moved closed together, the inner camming surface 250 always engages the same size frusto-conical surface.

In operation, the clamp knob 246 is rotated counter-clockwise to move the clamp knob 246 away from the adjustment ring 226 allowing the first and second projections 236 and 238 to separate enabling the adjustment ring 226 to be rotated about the motor housing 202 and the base 208. This movement of the adjustment ring 226 allows the motor housing 202 to axially move relative the base 208 to move the cutting tool to the desired depth relative the base 208. Once the cutting tool is at the preselected depth, the clamp knob 246 is moved toward the adjustment ring 226 by being rotated in the clockwise direction through finger pressure on the peripheral surface 288. The peripheral surface 288 is utilized because the helical ramp 300 located on the second side 298 of each of the tabs 294 limits the amount of force which can be applied thereon when turning the clamp knob 246 in the clockwise direction before the fingers slip off of the helical ramp 300. The helical ramp 300 prevents the clamp knob 246 from being overtightened. This is necessary because of the additional tightening which occurs from the vibration of the motor during use. The clamp knob 246 is only capable of being tightened by hand a sufficient amount to ensure that the cutting tool maintains its preselected depth during use.

Accordingly, there has been disclosed an improved depth of cut adjustment mechanism for a router. While exemplary embodiments have been disclosed herein, it will be appreciated by those skilled in the art that various modifications and adaptations to the disclosed embodiments may be made and it is only intended that this invention be limited by the scope of the appended claims.

What is claimed is:

1. A router comprising:

a motor housing having an external cylindrical portion:

a base having a cylindrical bore for slidably receiving therein said motor housing cylindrical portion;

an adjustment ring including means for releasably engaging said motor housing and said base to secure them together at various axial positions, said adjustment ring being split forming an opening between two opposed ends; and clamp means for releasably securing said adjustment ring to said motor housing so as to maintain the position of said base relative said motor housing, including;

a threaded member cooperating with the opposed ends of the adjustment ring;

a clamp knob threadingly cooperating with the threaded member and rotatable relative thereto in a first direction causing the adjustment ring to tighten and a second direction causing the adjustment ring to loosen, said clamp knob including tab means for limiting the torque which can be applied to the knob by a user in the first direction thereby preventing overtightening and enabling a relatively higher torque to be applied in the second direction to ensure the user can always release the adjustment ring.

2. The router of claim 1 wherein said clamp knob is provided with a frusto-conical surface; and said adjustment ring opposed ends are each provided with complementary ramped semi-circular projection surfaces for cooperation with said clamp knob frusto-conical surfaces.

3. The router of claim 1 wherein said clamp knob tab means comprises two diametrically opposed tabs.

4. The router of claim 1 wherein said clamp knob further includes a peripheral surface having a plurality of serrations to provide a finger grip separate from said tab means.

5. An arrangement for clamping a split ring to an interiorly disposed surface, said split ring having first and second opposed ends adjacent an opening therebetween, comprising:

a first projection formed on said split ring adjacent said first opposed end;

a second projection formed on said split ring adjacent said second opposed end;

said first and second projections each being formed as respective mirror-image halves of a frusto-conical structure;

a clamp knob having an inner surface adapted to slidably engage the frusto-conical surfaces of said first and second projections; and screw means for rotatably supporting said clamp knob with said inner surface engaging the frusto conical surfaces of both said first and second projections so that rotation of said clamp knob in a first direction causes movement of said clamp knob toward said split ring drawing said first and second projections toward each other and rotation of the clamp knob in a second direction causes movement of said clamp knob away from said split ring allowing said first and second projections to separate;

wherein said clamp knob includes tab means for limiting the torque which can be applied to the knob by a user in the first direction thereby preventing overtightening and enabling a relatively higher torque to be applied in the second direction to ensure the user can always release the adjustment ring.

6. The arrangement according to claim 5 wherein said clamp knob has a central internally threaded boss and said screw means includes a threaded member fixed against rotation with respect to said split ring and threadedly engaged with said boss.

7. The arrangement according to claim 5 wherein said clamp knob inner surface is frusto-conical to provide substantial surface engagement with said first and second projection surfaces.

8. A clamp knob for a router or the like comprising:

a body having a central axis and a peripheral surface extending circumferentially about said central axis between axially spaced body surfaces;

a tab extending axially outwardly from one of said body surfaces and radially outwardly from said central axis, said tab having a first side in perpendicular relation to said one of said body surfaces for receiving a finger grip to positively rotate said knob in a first direction, said tab having a second side opposite said first side, and helically ramped in relation to said first side limiting force capable of being applied when rotating said knob in a second direction opposite said first direction; and screw means formed on the body aligned with the central axis for cooperation with a corresponding threaded member to cause the clamp knob to axially advance relative to the threaded member when the clamp knob is rotated in the first direction and to axially retract the clamp knob when rotated in a second direction.

9. The clamp knob of claim 8 wherein said peripheral surface comprises a plurality of serrations to provide a second finger grip separate from said tab.

10. The clamp knob of claim 8 wherein said tab comprises two diametrically opposed tabs.

11. The clamp knob of claim 8 wherein the second side is circumferentially ramped in a helical transition from a tangent with said one of said body surfaces.

12. A router comprising:

a base having an annular groove circumferentially located about said base, said base having a cylindrical bore therein, a lower support surface attached thereto, and a pair of handles for manipulating said router;

a motor housing having a motor, a cutter shaft connected to and rotatably driven by said motor, said cutter shaft having a collet for receiving a cutting tool, said motor housing having an external screw thread circumferentially located about said motor housing and said motor housing being axially movable relative said base through said cylindrical bore for movement of said cutting tool to a selected depth relative said base;

an adjustment ring cooperating with said motor housing and said base, said adjusting ring having an internal screw thread cooperating with said external screw thread for movement of said motor housing relative said base in response to rotational movement of said adjustment ring along said external screw thread, said adjustment ring having an inwardly directed projection cooperating with said annular groove allowing rotatable movement of said adjustment ring about said base while preventing longitudinal movement of said adjustment ring relative said base; and a clamp knob extending radially from said adjustment ring and cooperating therewith for clamping and unclamping said adjustment ring, said adjustment ring rotatably cooperating with said external screw thread and said annular groove for movement of said motor housing relative said base for setting said cutting tool at a predetermined depth relative said base, said clamp knob having a body including a peripheral surface extending circumferentially about a central axis between spaced apart body surfaces and tab means having a first surface for positively rotating said clamp knob away from said adjustment ring allowing a first projection formed on said adjustment ring on a first opposed end and a second projection formed on said adjustment ring on a second opposed end to separate enabling movement of said adjustment ring, and said tab means having a second surface opposite said first surface for limiting force applied to said clamp knob when moving said clamp knob toward said adjustment ring drawing said first and second projections together preventing movement of said adjustment ring once the predetermined depth of said cutting tool has been set.

* * * * *